United States Patent
Tsai et al.

(10) Patent No.: US 8,218,412 B2
(45) Date of Patent: Jul. 10, 2012

(54) METHOD AND SYSTEM FOR DETERMINING DISC FORMAT FOR RECOVERY OF DATA RECORDING

(75) Inventors: Ping-Tsai Tsai, Kaohsiung (TW); Sung-Yang Wu, Hsinchu (TW); Pin-Chou Liu, Taipei Hsien (TW); Ya-Fang Nien, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 602 days.

(21) Appl. No.: 11/934,886

(22) Filed: Nov. 5, 2007

(65) Prior Publication Data

US 2009/0116368 A1    May 7, 2009

(51) Int. Cl.
  *G11B 5/55*    (2006.01)
  *G11B 7/125*   (2006.01)
  *G11B 20/10*   (2006.01)
  *G11B 20/18*   (2006.01)

(52) U.S. Cl. .............. 369/53.22; 369/47.1; 369/53.1

(58) Field of Classification Search ............ 369/53.2, 369/275.3
See application file for complete search history.

(56) References Cited

U.S. PATENT DOCUMENTS

| | | | |
|---|---|---|---|
| 6,707,774 B1 | 3/2004 | Kuroda et al. | |
| 2002/0044509 A1* | 4/2002 | Nakajima | 369/53.22 |
| 2004/0130992 A1* | 7/2004 | Idobuchi | 369/53.37 |
| 2006/0198249 A1* | 9/2006 | Okada | 369/1 |
| 2007/0258340 A1* | 11/2007 | Lin | 369/47.13 |

FOREIGN PATENT DOCUMENTS

| | | |
|---|---|---|
| CN | 1242570 | 1/2000 |
| TW | I270062 | 1/2007 |

OTHER PUBLICATIONS

English language translation of abstract of CN 1242570 (published Jan. 26, 2000).
English language translation of abstract of TW I270062 (published Jan. 1, 2007).

* cited by examiner

*Primary Examiner* — Joseph Haley
*Assistant Examiner* — Nicholas Lee
(74) *Attorney, Agent, or Firm* — Thomas|Kayden (57) ABSTRACT

A method for determining a disc format is disclosed. Data from at least one address of the disc is retrieved, wherein the at least one address is selected from a plurality of predetermined addresses related to the disc format. The disc format is determined according to the retrieved data.

18 Claims, 6 Drawing Sheets

METHOD AND SYSTEM FOR DETERMINING DISC FORMAT FOR RECOVERY OF DATA RECORDING

BACKGROUND OF THE INVENTION

1. Field of the Invention

The invention relates to data recovery, and in particular to a method for determining a disc format for recovery of a data recording.

2. Description of the Related Art

Data related to discs and recording status thereof, such as table of contents (TOC), session disc control blocks (SDCB), and recording management area (RMD), after being recorded, may not be correctly read if the surface of the disc is scraped or a data recording fails, thus, disc information, comprising next writeable addresses (NWA), track numbers, track information, and others, cannot be correctly retrieved. Thus, a digital video recorder (DVR) cannot properly play video files recorded on the disc or record data to a recorded disc.

Thus, it is desired to have a data recovery method for discs according to a disc format thereof, allowing read and write operations thereon.

BRIEF SUMMARY OF THE INVENTION

Methods for determining a disc format for recovery of a data recording are provided. An exemplary embodiment of a method for determining a disc format comprises the following. Data from at least one address of the disc is retrieved, which is selected from a plurality of predetermined addresses related to the disc format. The disc format is determined according to the retrieved data.

Systems for determining a disc format for recovery of a data recording are provided. An exemplary embodiment of a system for determining a disc format comprises a retrieve module and a determination module. The retrieve module retrieves data from at least one address of the disc, selected from a plurality of predetermined addresses related to the disc format. The determination module determines the disc format according to the retrieved data.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 4, which generally relate to determining a disc format for recovery of a data recording. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The disc information in a lead-in area of a disc may not be retrieved or is not updated after a write operation due to abnormal conditions. Hence, the disc information of the disc such as track number and a next writeable address (NWA) for each track may be obtained by identifying its disc type and in accordance with the data format of the identified disc type.

Figure 1A:
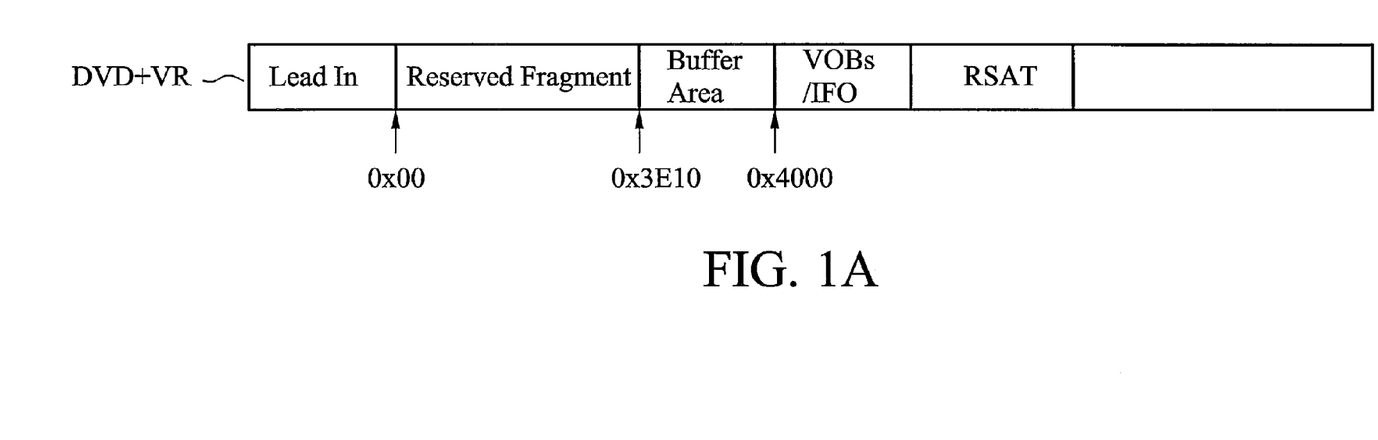
FIG. 1A shows an exemplary format of a DVD+R Video Format Specifications (DVD+VR) disc.

FIG. 1A shows an exemplary format of a DVD Video Recording Format Specifications (DVD+VR) disc. In recording data on a DVD+VR disc, data is first recorded in a buffer area with a start address 0x3E10 following a reserved fragment, and video data, known as video object set (VOB), is then recorded from an address 0x4000, as shown in FIG. 1A. Hence, with the data format shown in FIG. 1A, two methods are provided for determining whether the disc is a DVD+VR disc or not in the following.

In the first method, a tag, such as "+VR", can be recorded in the buffer area of the DVD+VR disc within the addresses 0x3E10 to 0x4000, as shown in FIG. 1A. If data read from the addresses 0x3E10 to 0x4000 contains this tag, it is determined that the disc a DVD+VR disc. In the second method, since video data is generally recorded from the address 0x4000 for most recorded format discs, a next writeable address (NWA) search operation can be performed from the address 0x4000 to the end of the logical sector number (LSN) of the disc which indicates the last address of the disc. When a next writeable address (NWA) is located, the data stored at the last address of the NWA is read. If the structure of the data is a reserved space allocation table (RSAT) structure, it is determined that the disc is a DVD+VR disc. Thus, the disc information of the disc can be recovered and updated based on the DVD+VR format. According to the DVD+VR specification, a DVD+VR disc comprise two tracks wherein the address of the first track is between 0x00 which is a beginning of the logical sector number (LSN) of the disc to 0x3E10 and the second track is between 0x3E10 to the end of LSN of the disc.

Figure 1B:
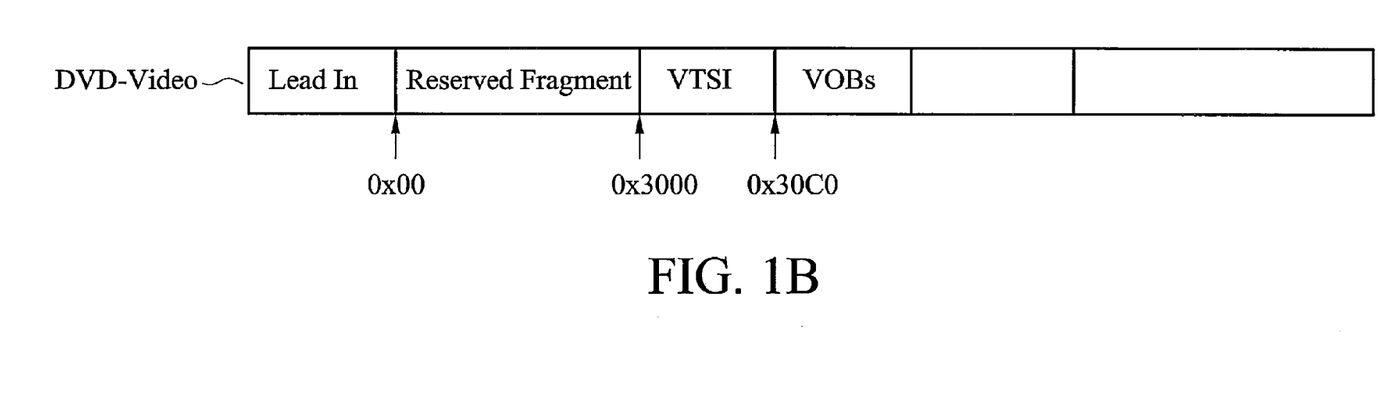
FIG. 1B shows an exemplary format of a DVD-VIDEO disc.

Other disc formats including DVD-Video Format Recording (DVD-VIDEO) and DVD Specification for Re-recordable Disc DVD-RW (DVD-VR) formats are described in the following. FIG. 1B shows an exemplary format of a DVD-VIDEO disc. As shown, a fragment (track 1) is reserved to write file system data when a disc is finalized, another fragment (track 2) with a 0x00C0 size starting from the address 0x3000 is reversed to write video title set information (VTSI), and VOB is written in a further fragment (track 3) from the address 0x30C0.

Figure 1C:
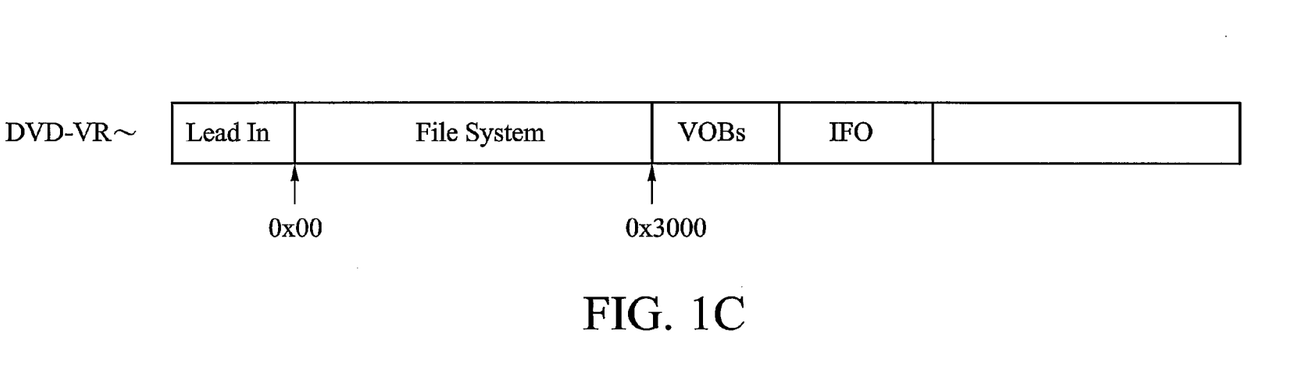
FIG. 1C illustrates an exemplary DVD-VR format disc.

FIG. 1C illustrates an exemplary format of a DVD-VR disc. When a data recording begins, file system data is written between the addresses 0x00 to 0x3000, and video data and information (IFO) tables are then written. Regardless of disc formats or track numbers, because file system data must be written when a data recording is executed, it is important that a next writeable address (NWA) can be retrieved and video data can be read in the first track. Thus, identification of the size of the first track and the last recorded address (LRA) is essential.

Figure 2:
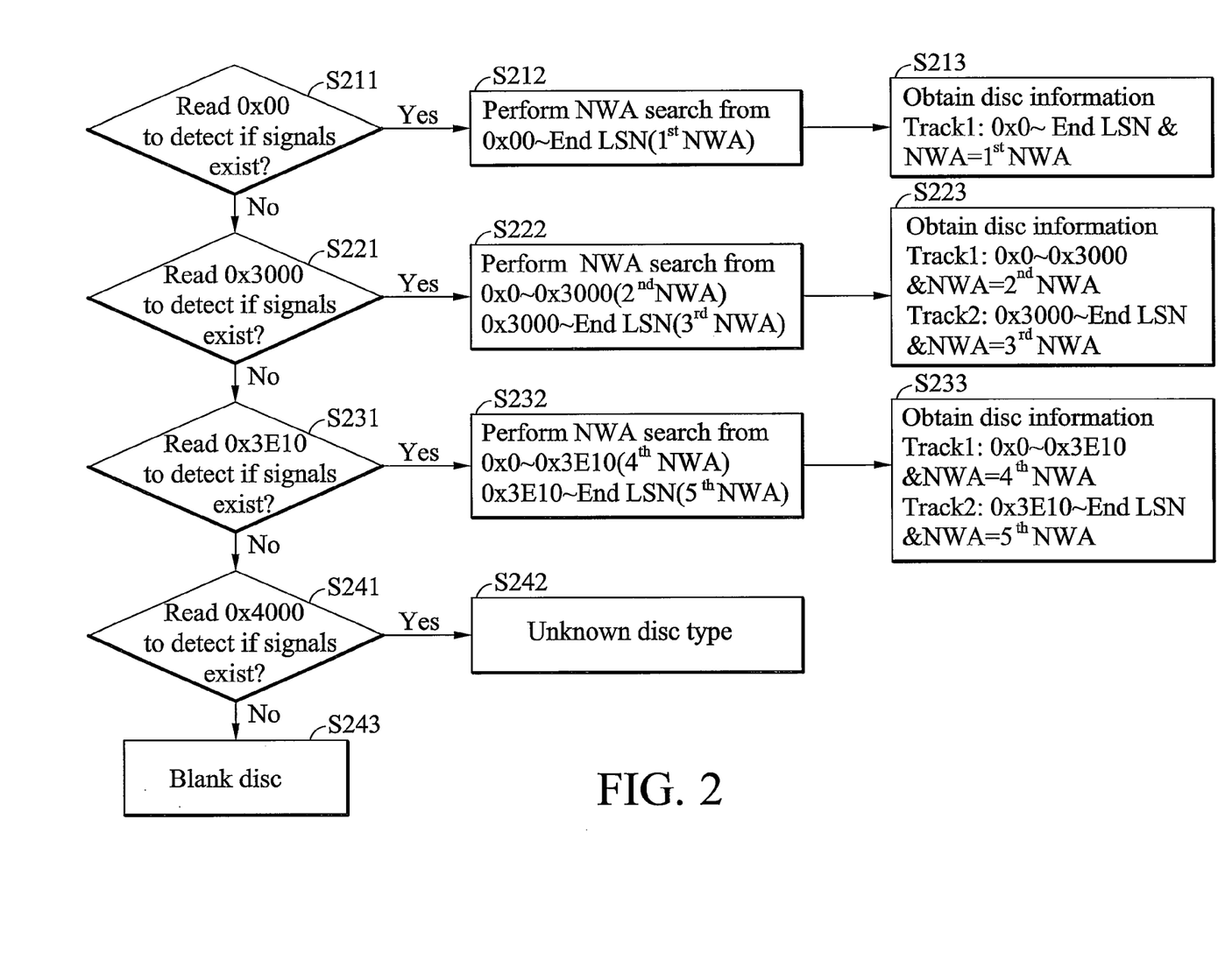
FIG. 2 is a flowchart of an embodiment of a method for determining a disc format for recovery of a data recording.

FIG. 2 is a flowchart of an embodiment of a method for determining a disc format for recovery of a data recording. Data at the address 0x00 of a disc is first read to determine whether signals are detected (step S211). Signals detected at the address 0x00, indicate video data has been recorded at the address, and thereby the disc may be finalized or comprise only one track (track 1) such as a DVD-VR disc. Thus, a next writeable address (NWA) search operation is performed from the address 0x00 to the end of the logical sector number (LSN) of the disc (step S212). The next writeable address $1^{st}$ NWA of the track 1 is located on the disc and the disc comprises one track, track 1, which begins with the address 0x00 to the end of the logical sector number (LSN). Thus, information related to the disc is obtained (step S213).

No signal detected at the address 0x00 in step S211 indicates the disc is not finalized. Data at the address 0x3000 of the disc is then read to determine whether signals are detected (step S221). If Signals are detected at the address 0x3000, it indicates the disc may be a DVD-VIDEO disc comprising two tracks which are track 1 with addresses 0x00 to 0x3000, and track 2 with addresses 0x3000 to the end of LSN. A NWA search operation is performed from the address 0x00 to the address 0x3000 and the address 0x3000 to the end of the logical sector number (LSN) of the disc respectively (step S222). Two next writeable addresses, $2^{nd}$ and $3^{rd}$ NWA, corresponding to the track 1 and track 2, are then located on the disc. The first track, track 1, begins from the address 0x00 to the address 0x3000 and the second track, track 2, begins from the address 0x3000 to the end of the logical sector number (LSN) of the disc. Thus, information of this disc including track numbers, their corresponding address ranges and corresponding NWAs are obtained (step S223).

If no signal is detected at the address 0x3000 in step S221, data at the address 0x3E10 of the disc is then read to determine whether signals are detected (step S231). If signals at the address 0x3E10 are detected, it indicates the disc may be a DVD+VR disc comprising two tracks wherein the first track, track 1, which begins from addresses 0x00 to 0x3E10, and the second track, track 2, which begins from addresses 0x3E10 to the end LSN. A next writeable address (NWA) search operation is performed from the address 0x00 to the address 0x3E10 and the address 0x3E10 to the end of the logical sector number (LSN) of the disc (step S232). Two next writeable addresses, $4^{th}$ and $5^{th}$ NWA, corresponding the track 1 and track 2, are located on the disc. The first track, track 1, begins from the address 0x00 to the address 0x3E10 and the second track, track 2, begins from the address 0x3E10 to the end of the logical sector number (LSN) of the disc. Thus, information of this disc including track numbers, their corresponding address ranges and corresponding NWAs are obtained (step S233).

If no signal is detected at the address 0x3E10, data at the address 0x4000 of the disc is read to determine whether signals are detected since according to practices, data is recorded on the disc at least from the address 0x4000 (step S241). If signals are detected at the address 0x4000, the disc type may be unknown (step S242). If no signal is detected at the address 0x4000, the disc may be a blank disc (step S244).

However, it is noted that the invention may be modified to read data at another address instead of 0x4000 in step S241 provided that data should be recorded at this address if there is data recorded on the disc.

Figure 1D:
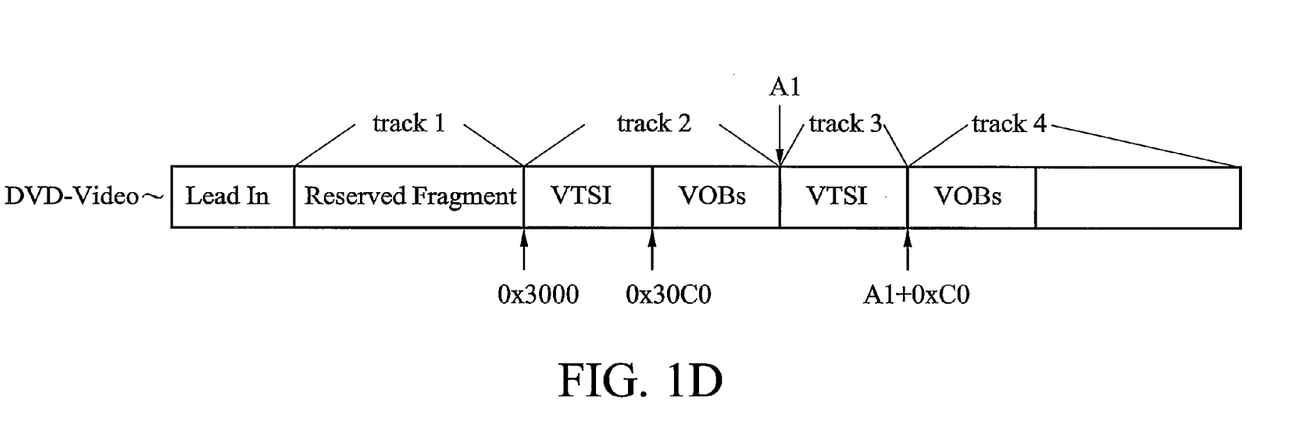
FIG. 1D shows an example of data recorded on a DVD-VIDEO disc with an abnormal interrupt.

However, video data may not be successively and continuously recorded, such that session disc control block (SDCB) or Recording Management Data (RMD) on the disc cannot be read and the video data can not be recovered. FIG. 1D shows an example of data recorded on a DVD-VIDEO disc with more than one VTSI data recorded wherein an abnormal interrupt occurs during data recording so that VTSI is not recorded in the latter VTSI fragment. Hence a next writeable address (NWA) may be mistakenly located when a next writeable address (NWA) search operation is performed when the disc is taken as a DVD-VIDEO disc shown FIG. 1 B and a next writeable address (NWA) search operation is performed from the address 0x00 to 0x3000 and from 0x3000 to the end of the logical sector number (LSN) of the disc respectively. Since as shown in FIG. 1D, the DVD-VIDEO disc comprises 4 tracks with addresses from the address 0x00 to the address 0x3000, from the address 0x3000 to the address A1 which is the starting address of the last VTSI fragment and recorded in the former VTSI fragment, from the address A1~ to the address A1+0xC0 (the length of a VTSI), and from the address A1+0xC0 to the end of the logical sector number (LSN), respectively, of the DVD-VIDEO disc and disc information should be obtained for tracks 1~ corresponding to the searched addresses.

Figure 1E:
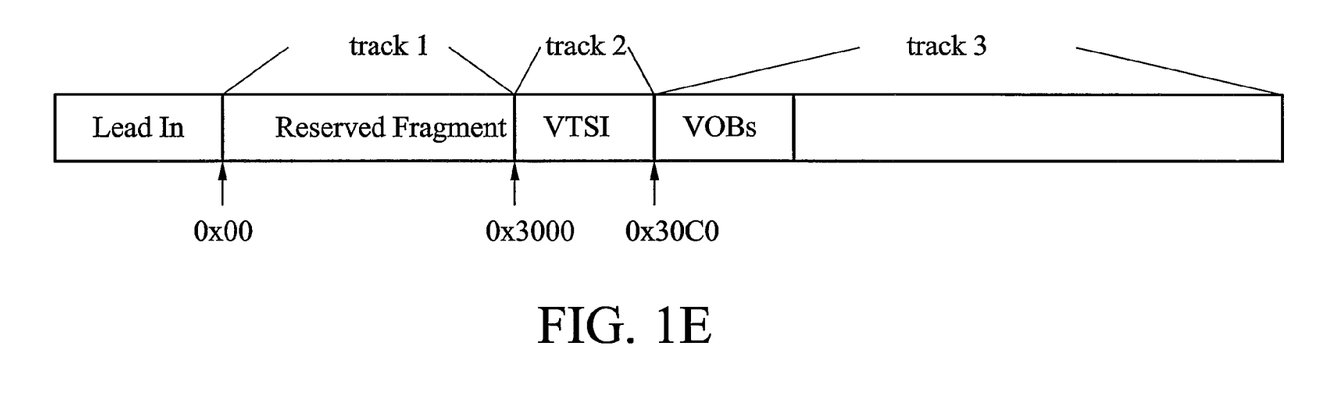
FIG. 1E shows another example of data recorded on a DVD-VIDEO disc with an abnormal interrupt.
Figure 1F:
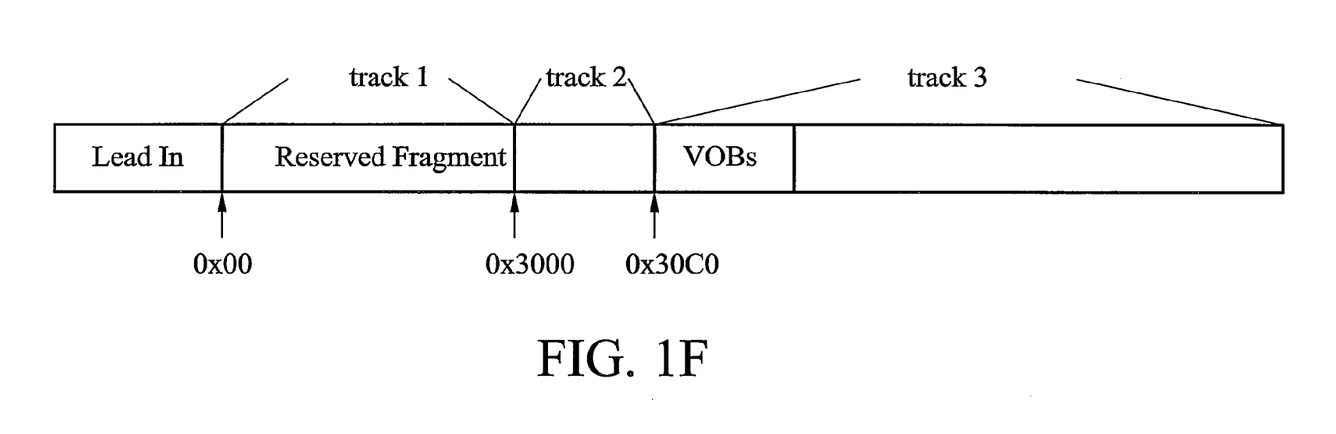
FIG. 1F shows another example of data recorded on a DVD-VIDEO disc with an abnormal interrupt.

FIG. 1E shows another example of data recorded on a DVD-VIDEO disc with only one VTSI data recorded. As shown, the DVD-VIDEO disc comprises 3 tracks with addresses from 0x00 to 0x3000, from 0x3000 to 0x30C0, and from 0x30C0 to the LSN of the disc. A next writeable address (NWA) search operation for this DVD-VIDEO disc is performed on each track within corresponding address range and thereby disc information for tracks 1~3 is obtained. FIG. 1F shows another example of data recorded on a DVD-VIDEO disc with no VTSI data recorded. Compared with FIG. 1E, a VTSI space has been reserved and no VTSI data is recorded therein. Thus, the last VTSI address A1 is assigned as 0x3000 and signals are detected at the address 0x30C0 instead of the addresses 0x00 and 0x3000.

An exemplary embodiment of an improved method is described in the following.

Figure 3:
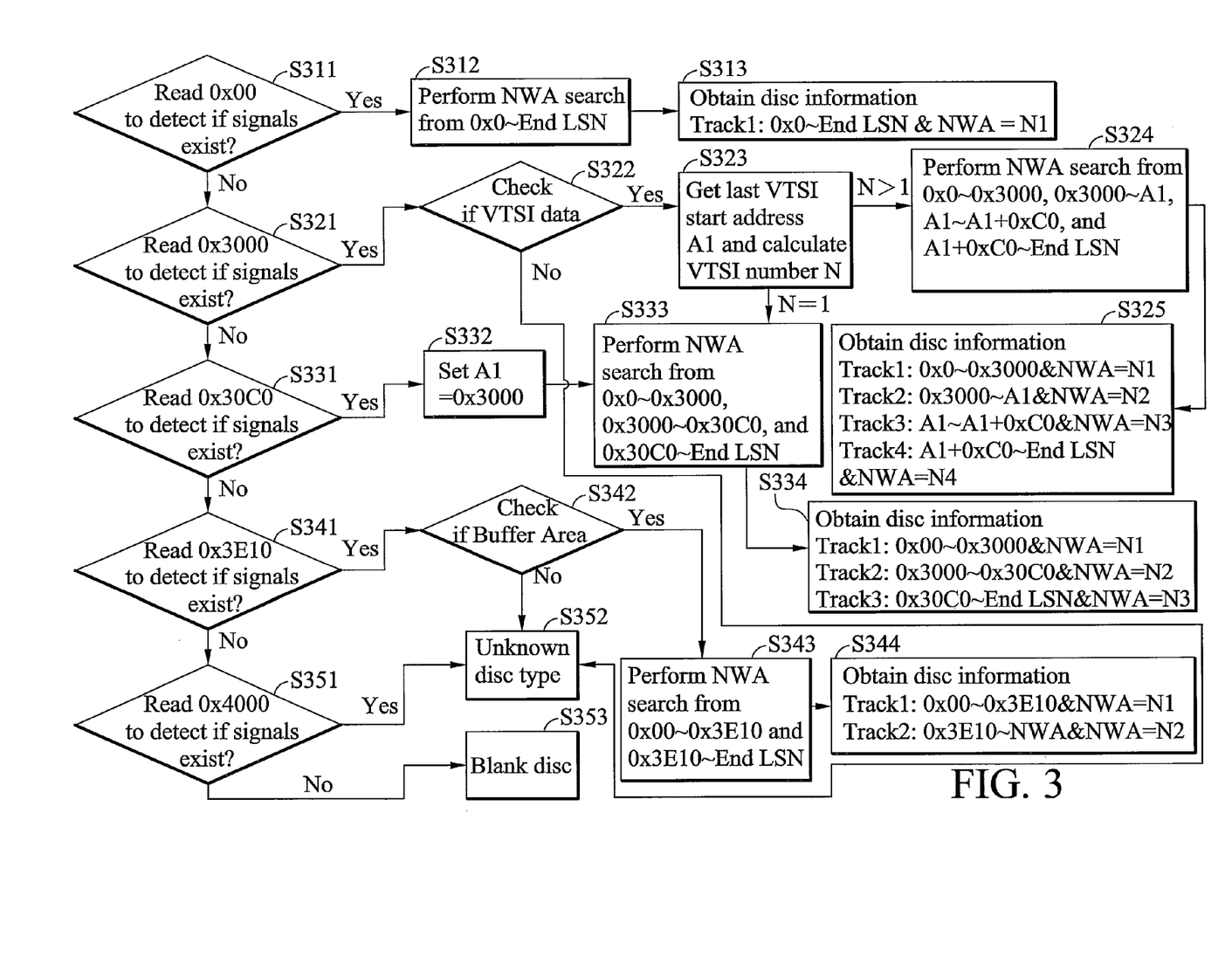
FIG. 3 is a flowchart of another embodiment of a method for determining a disc format for recovery of a data recording.

FIG. 3 is a flowchart of another embodiment of a method for determining a disc format for recovery of a data recording. Data at the address 0x00 of a disc is first read to determine whether signals are detected (step S311). Signals detected at the address 0x00, indicate video data has been recorded at the address, and thereby the disc may be finalized or comprise only one track. Thus, a next writeable address (NWA) search operation is performed from the address 0x00 to the end of the logical sector number (LSN) of the disc (step S312). The next writeable address ($1^{st}$ NWA) then is located on the disc and the disc comprises one track, track 1, which begins from the address 0x00 to the end of the logical sector number (LSN) of the disc. Thus, information related to the disc is obtained (step S313).

No signal detected at the address 0x00 indicates the disc is not finalized. Data at the address 0x3000 of the disc is read to determine whether signals are detected (step S321). If signals are detected at the address 0x3000, it is then determined whether recorded data is VTSI data (step S322). If the recorded data is not VTSI data, the disc type may be unknown (step S352). Conversely, if the recorded data is the VTSI data, a start address A1 of the last VTSI data of the disc is retrieved since each VTSI data contains the start address of a following VTSI. Moreover, the number of the VTSI of the disc, N, is calculated (step S323). If N is greater than 1, the disc may be a DVD-VIDEO disc as shown in FIG. 1D, thus a next writeable address (NWA) search operation is performed from the address 0x00 to the address 0x3000, from the address 0x3000 to the address A1, from the address A1 to the address A1+0xC0, and from the address A1+0xC0 to the end of the logical sector number (LSN) (step S324). Thus, the disc comprise 4 tracks including a first track, track 1, which begins from the address 0x00 to the address 0x3000, a second track, track 2, which begins from the address 0x3000 to the address A1, a third track, track 3, which begins from the address A1 to the address A1+0xC0, and a fourth track, track 4, which begins from the address A1+0xC0 to the end of the logical sector number (LSN) of the disc, and four next writeable addresses N1~N4 are located on each track. Information related to the disc is obtained (step S325).

If N is equal to 1 in step S323, the disc may be a DVD-VIDEO disc as shown in FIG. 1E, thus a next writeable address (NWA) search operation is performed from the address 0x00 to the address 0x3000, from the address 0x3000 to the address 0x30C0, and from the address 0x30C0 to the end of the logical sector number (LSN) (step S333). Thus, the disc comprise 3 tracks including a first track, track 1, which begins from the address 0x00 to the address 0x3000, a second track, track 2, which begins from the address 0x3000 to the address 0x30C0, and a third track, track 3, which begins from the address 0x30C0 to the end of the logical sector number (LSN) of the disc, and three next writeable addresses N~N3 are located on each track. Information related to the disc is then obtained (step S334).

If no signal is detected at the address 0x3000 in step S321, data at the address 0x30C0 of the disc is then read to determine whether signals are detected (step S331). If signals at the address 0x30C0 are detected, the disc may be a DVD-VIDEO disc as shown in FIG. 1F and thus the address A1 (the start address of the last VTSI) is set to 0x3000 (step S332), and the process proceeds to step S333. A next writeable address (NWA) search operation is performed from the address 0x00 to the address 0x3000, from the address 0x3000 to the address 0x30C0, and from the address 0x30C0 to the end of the logical sector number (LSN) (step S333). Thus, the disc comprise 3 tracks including a first track, track 1, which begins from the address 0x00 to the address 0x3000, a second track, track 2, which begins from the address 0x3000 to the address 0x30C0, and a third track, track 3, which begins from the address 0x30C0 to the end of the logical sector number (LSN) of the disc, and three next writeable addresses N1~N3 are located on each track. Information related to the disc is then obtained (step S334).

If no signal is detected at the address 0x30C0 in step S331, data at the address 0x3E10 of the disc is then read to determine whether signals are detected (step S341). If signals at the address 0x3E10 are detected, it indicates the disc may be a DVD+VR disc, it is then determined whether a fragment starting from the address 0x3E10 is a buffer area or comprises a user defined flag, such as "+VR" (step S342). The fragment can be determined to be a buffer area if filled with zero. If it is determined not be a buffer area or contains no flag, the disc type may be unknown (step S352). If it is a buffer area or contains a user-defined flag indicating the disc is a DVD+VR disc, the disc is a DVD+VR formatted disc. A next writeable address (NWA) search operation is performed from the address 0x00 to the address 0x3E10 and from the address 0x3E10 to the end of the logical sector number (LSN) of the disc (step S343). Thus, the disc comprise two tracks including a first track, track 1, which begins from the address 0x00 to the address 0x3E10, and a second track, track 2, which begins from the address 0x3E10 to the end of the logical sector number (LSN) of the disc and two next writeable addresses N1 and N2 are located on each track. Information of this disc including track numbers, their corresponding address ranges and corresponding NWAs are obtained accordingly (step S344). It is noted that step S342 is optional that the method may proceed to step S343 after step S341.

If no signal is detected at the address 0x3E10, data at the address 0x4000 of the disc is read to determine whether signals are detected (step S351). If signals are detected at the address 0x4000, the disc type may be unknown (step S352). If no signal is detected at the address 0x4000, the disc may be a blank disc (step S353).

In the described embodiments shown in FIGS. 2 and 3, a disc format is determined by physical or logic characteristics of signals read from the disc. As shown in FIG. 2, a disc format is determined by physical characteristics of accessed signals from the disc, indicating the disc format is determined by detecting whether and where data is recorded in the disc. As shown in FIG. 3, a disc format is determined by logic characteristics of accessed signals from the disc, indicating the disc format is determined by analyzing and parsing data recorded on the disc for searching a next rewritable address (NWA).

Figure 4:
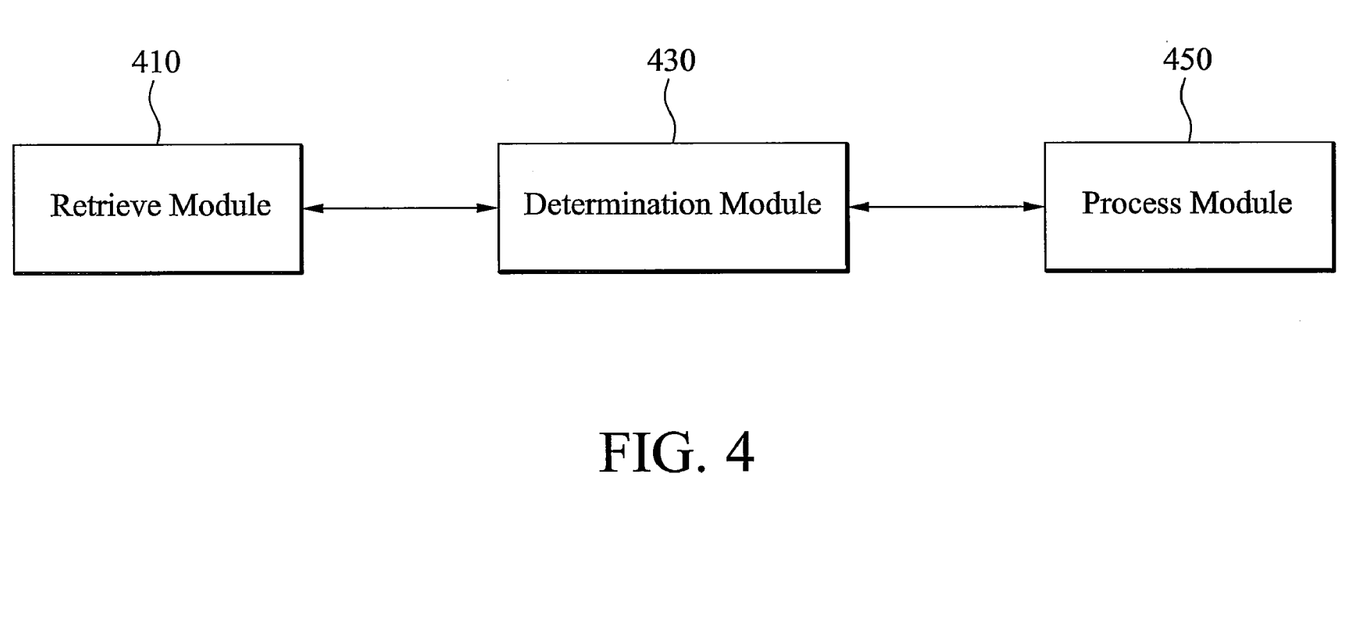
FIG. 4 is a view diagram of an embodiment of a system for determining a disc format for recovery of a data recording.

FIG. 4 is a view diagram of an embodiment of a system for determining a disc format. An embodiment of the system can be applied to a digital video recorder (DVR), a blue-ray disc, or a hard disc DVD recorder (HD-DVD).

The system comprises a retrieve module 410 and a determination module 430, and a process module 450. Retrieve module 410 retrieves data from at least one address of the disc, selected from a plurality of predetermined addresses related to the disc format. Determination module 430 determines the disc format according to the retrieved data. Process module 450 performs NWA search operations according to the determined disc format. Detained processes of data retrieve, format determination, and search operation implementation have been described above, which are not further described herein.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for determining a disc data format of a disc defining a format in which data is arranged on the disc, comprising:

retrieving data from at least one address of the disc, the one address being selected from a plurality of predetermined addresses, wherein the plurality of predetermined addresses exclude addresses associated with a lead-in area of the disc; and determining the disc data format based on the value of the one address and the value of the data retrieved from the one address, wherein when the selected address is 0x3E10, the disc data format is determined to be DVD+VR format if there is data at the selected address for retrieval.

2. The method for determining the disc data format of the disc as claimed in claim 1, wherein the disc data format a logical disc data format.

3. The method for determining the disc data format of the disc as claimed in claim 1, wherein the predetermined addresses related to the disc data format comprise 0x0000, 0x3000, 0x30C0, 0x3E10 and 0x4000.

4. The method for determining the disc data format of the disc as claimed in claim 1, further comprising determining disc information of the disc according to the determined disc data format.

5. The method for determining the disc data format of the disc as claimed in claim 4, wherein the disc information is a number of tracks of the disk, a corresponding address range of each track of the disc, or a next written address (NWA) of each track of the disc.

6. The method for determining the disc data format of the disc as claimed in claim 1, further comprising performing a next written address (NWA) search operation according to the determined disc data format.

7. The method for determining the disc data format of the disc as claimed in claim 1, wherein when the selected address is a beginning of a logical sector number (LSN) of the disc, the disc is a finalized disc if there is data at the selected address for retrieval.

8. The method for determining the disc data format of the disc as claimed in claim 7, further comprising:

performing a NWA search operation from the beginning to an end of the LSN of the disc; and obtaining disc information of the disc including a track number as one track, a corresponding address range of the track which is from the beginning to the end of the LSN of the disc, and a next written address (NWA) of the track, obtained from the performed NWA search operation.

9. The method for determining the disc data format of the disc as claimed in claim 1, further comprising:

performing NWA search operations from a beginning of the LSN of the disc to the address 0x3E10 and the address 0x3E10 to an end of the LSN of the disc respectively; and obtaining disc information of the disc including a track number as two tracks, two corresponding address ranges of the two tracks which are from the beginning of the LSN of the disc to the address 0x3E10 and the address 0x3E10 to the end of LSN of the disc respectively, and a corresponding next written address (NWA) of each track, obtained from the performed NEA search operations.

10. The method for determining the disc data format of the disc as claimed in claim 1, wherein when the selected address is 0x3000, the disc data format is determined to be DVD-VIDEO if there is data at the selected address for retrieval.

11. The method for determining the disc data format of the disc as claimed in claim 10, further comprising:

performing NWA search operations from a beginning of the LSN of the disc to the address 0x3000 and the address 0x3000 to an end of the LSN of the disc respectively; and obtaining disc information of the disc including a track number as two tracks, two corresponding address ranges of the two tracks which are from the beginning of the LSN of the disc to he address 0x3000 and the address 0x3000 to the end of LSN of the disc respectively, and a corresponding written address (NWA) of each track, obtained from the performed NWA search operations.

12. A method for determining a disc format of a disc comprising:

retrieving data from at least one address of the disc, selected from a plurality of predetermined addresses related to the disc format;

determining the disc format according to the retrieved data;

determining whether the retrieved data is video title set information (VTSI) data;

obtaining a starting address of a last item of the VTSI data;

calculating a number of the VTSI data; and obtaining disc information of the disc according to the determined disc format and the number of the VTSI data.

13. The method for determining the disc format of the disc as claimed in claim 12, wherein the selected address is 0x3000 and the determined disc format is DVD-Video.

14. The method for determining the disc format of the disc as claimed in claim 12, further comprising performing a NWA search operation according to the determined disc format and the number of the VTSI data.

15. A method for determining a disc format of a disc comprising:

retrieving data from at least one address of the disc, selected from a plurality of predetermined addresses related to the disc format;

determining the disc format according to the retrieved data; and checking whether a fragment starting from the selected address is a buffer area if there is data at the selected address for retrieval and the disc format is determined according to the checking result.

16. The method for determining the disc format of the disc as claimed in claim 15, wherein the selected address is 0x3E10 and the determined disc format is DVD+VR.

17. A system for determining a disc format of a disc comprising:

a retrieve module, retrieving data from at least one address of the disc, selected from a plurality of predetermined addresses related to the disc format;

a determination module, determining the disc format according to the retrieved data; and a process module, determining whether the retrieved data is video title set information (VTSI) data, obtaining a starting address of a last item of the VTSI data, calculating a number of the VTSI data, performing a NWA search operation according to the determined disc format and the number of the VTSI data, and obtaining disc information of the disc according to the determined disc format and the number of the VTSI data.

18. A system for determining a disc format of a disc comprising:
  a retrieve module, retrieving data from at least one address of the disc, selected from a plurality of predetermined addresses related to the disc format;
  a determination module, determining the disc format according to the retrieved data; and
  a process module determining whether a fragment starting from the selected address is a buffer area, wherein the determination module determines the disc format according to the check result from the process module.

* * * * *